United States Patent
Breedvelt-Schouten

(10) Patent No.: US 10,896,027 B2
(45) Date of Patent: *Jan. 19, 2021

(54) DEFINING METRICS THRESHOLDS FOR RANGES USING A PARAMETERIZED LINE OF TEXT SYNCHRONIZED WITH AN INTERACTIVE DISPLAY

(71) Applicant: International Business Machines Corporation, Armonk, NY (US)

(72) Inventor: Ilse M. Breedvelt-Schouten, Manotick (CA)

(73) Assignee: International Business Machines Corporation, Armonk, NY (US)

(*) Notice: Subject to any disclaimer, the term of this patent is extended or adjusted under 35 U.S.C. 154(b) by 6 days.

This patent is subject to a terminal disclaimer.

(21) Appl. No.: 16/149,917

(22) Filed: Oct. 2, 2018

(65) Prior Publication Data

US 2019/0034174 A1    Jan. 31, 2019

Related U.S. Application Data

(63) Continuation of application No. 14/949,205, filed on Nov. 23, 2015, now Pat. No. 10,101,975.

(51) Int. Cl.
 *G06F 9/44* (2018.01)
 *G06F 8/34* (2018.01)
 *G06F 40/205* (2020.01)

(52) U.S. Cl.
 CPC .............. *G06F 8/34* (2013.01); *G06F 40/205* (2020.01)

(58) Field of Classification Search
 CPC ........... G06F 8/34; G06F 8/423; G06F 40/205

USPC .................................................. 717/100–120
See application file for complete search history.

(56) References Cited

U.S. PATENT DOCUMENTS

| | | | |
|---|---|---|---|
| 8,380,648 | B2 | 2/2013 | Matson et al. |
| 9,438,480 | B2 | 9/2016 | Kane et al. |
| 9,990,123 | B2 | 6/2018 | Winther Jespersen et al. |
| 10,101,975 | B2* | 10/2018 | Breedvelt-Schouten ................ G06F 40/205 |

(Continued)

OTHER PUBLICATIONS

List of IBM Patents or Patent Applications Treated as Related, Oct. 2, 2018, 2 pages.

(Continued)

*Primary Examiner* — Chuck O Kendall
(74) *Attorney, Agent, or Firm* — Stephen R. Tkacs; Stephen J. Walder, Jr.; Richard A. Wilhelm

(57) ABSTRACT

A mechanism is provided in a data processing system for defining metrics thresholds. The mechanism presents a flexible sentence structure in a user interface. The flexible sentence structure includes a plurality of parameters for defining an alert for a selected data cell. The parameters include an intersect name of the selected data cell, a threshold range type, and one or more alert threshold values. The mechanism presents an interactive graphical display in the user interface. The interactive graphical display includes a plurality of range bands and one or more threshold value indicators corresponding to the parameters of the flexible sentence structure. The mechanism makes changes to the flexible sentence structure and the interactive graphical display responsive to a user interaction to form a metrics threshold definition. The mechanism generates code that creates alerts according to the metrics threshold definition.

20 Claims, 6 Drawing Sheets

(56) References Cited

U.S. PATENT DOCUMENTS

| | | |
|---|---|---|
| 10,140,310 B1 | 11/2018 | Kendall et al. |
| 2014/0100923 A1 | 4/2014 | Strezo et al. |
| 2015/0042474 A1 | 2/2015 | Becker Antley et al. |
| 2017/0068550 A1 | 3/2017 | Zeitlin |
| 2017/0147293 A1* | 5/2017 | Breedvelt-Schouten .................... G06F 8/34 |

OTHER PUBLICATIONS

"Zoom in to a Graph", Amazon Web Services, http://docs.aws.amazon.com/AmazonCloudWatch/latest/DeveloperGuide/zoom_in_on_graph.html, Amazon CloudWatch, Developer Guide, API Version Aug. 1, 2010, 2 pages.

Kluepfel, Gail, "Are You Being Served?", West Monroe Partners, http://blog.westmonroepartners.com/are-you-being-served/, Our Blog: Our Perspectives, Aug. 28, 2014, 2 pages.

Koch, Dibyajyoti, "How to design Periodic Alert to send emails?", WordPress, https://imdjkoch.wordpress.com/tag/periodic-alert/, A Blog on Oracle Application, Dec. 1, 2011, 11 pages.

Rittman, Mark, "Managing Your Oracle Business Intelligence Infrastructure using the Oracle Enterprise Manager 10g Rel 4 BI Management Pack", Oracle, http:www.oracle.com/technetwork/articles/rittman-oem-bipack-087508.html, Oracle Technology Network: Articles, Developer: BI, Feb. 2009, 15 pages.

\* cited by examiner

FIG. 3A
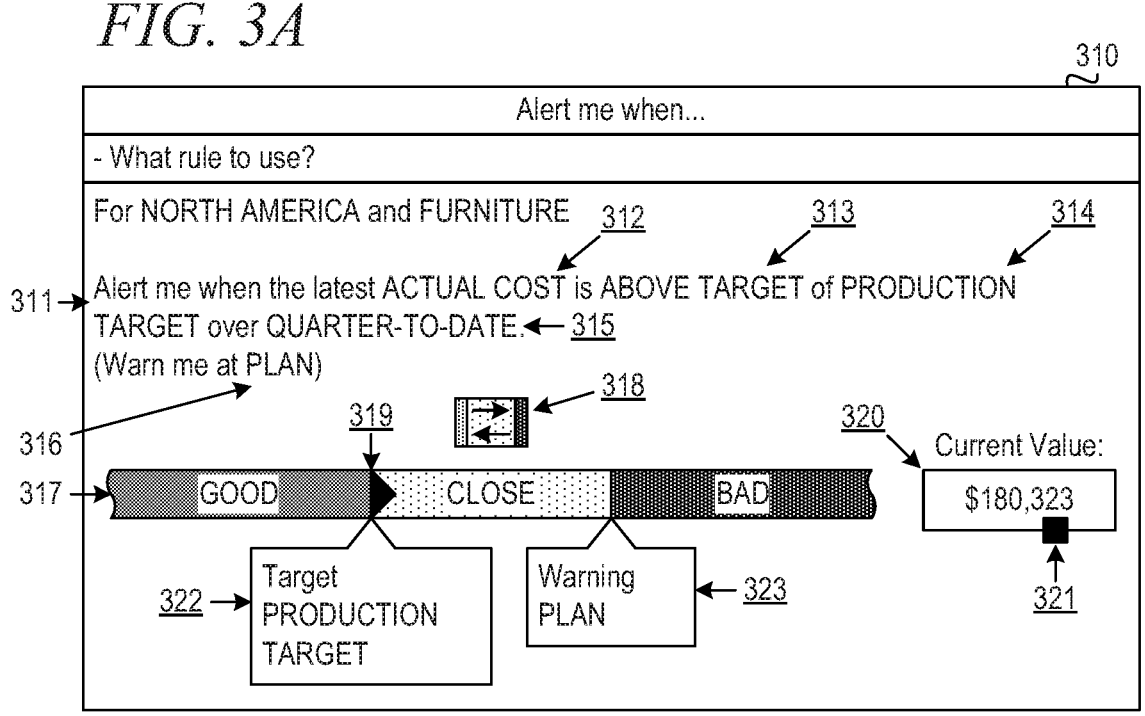
FIG. 3B
FIG. 3C
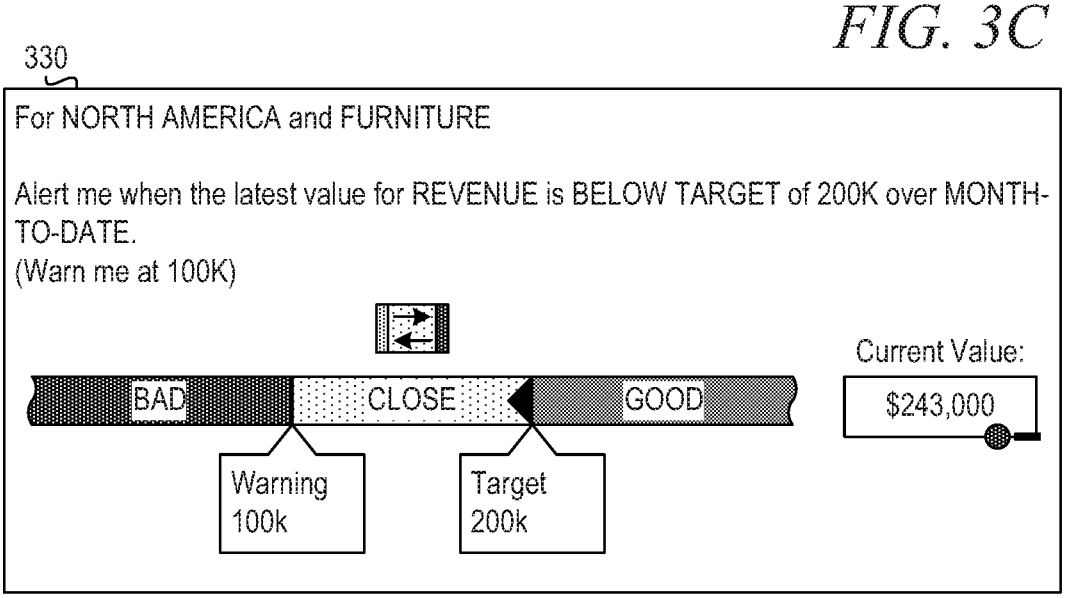

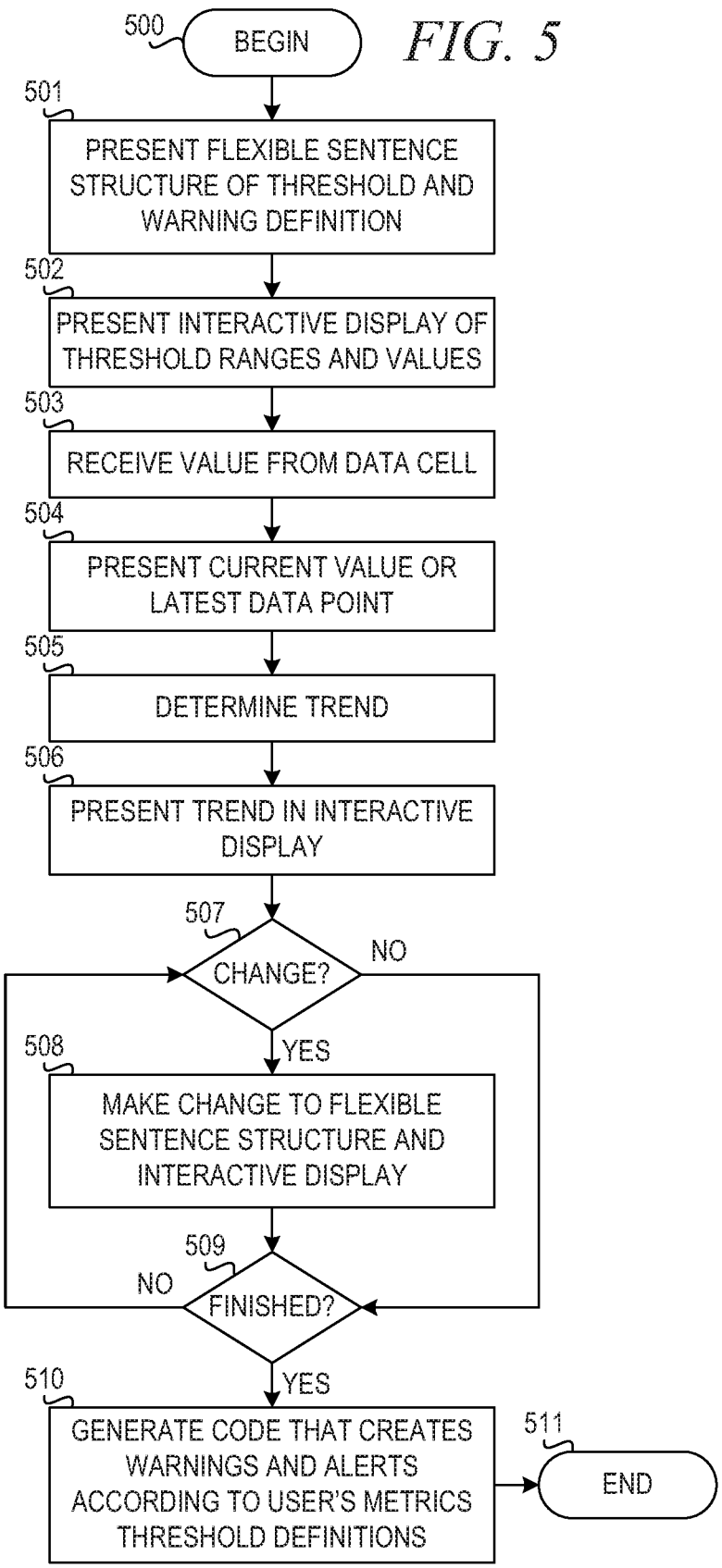

DEFINING METRICS THRESHOLDS FOR RANGES USING A PARAMETERIZED LINE OF TEXT SYNCHRONIZED WITH AN INTERACTIVE DISPLAY

BACKGROUND

The present application relates generally to an improved data processing apparatus and method and more specifically to mechanisms for defining metrics threshold for ranges using a parameterized line of text synchronized with an interactive display.

Analytics is the discovery and communication of meaningful patterns in data. Especially valuable in areas rich with recorded information, analytics relies on the simultaneous application of statistics, computer programming, and operations research to quantify performance. Analytics often favors data visualization to communicate insight. Firms may commonly apply analytics to business data to describe, predict, and improve business performance. Specifically, areas within analytics include predictive analytics, enterprise decision management, retail analytics, store assortment and stock-keeping unit optimization, marketing optimization and marketing mix modeling, web analytics, sales force sizing and optimization, price and promotion modeling, predictive science, credit risk analysis, and fraud analytics. Since analytics can require extensive computation, the algorithms and software used for analytics harness the most current methods in computer science, statistics, and mathematics.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for defining metrics thresholds. The method comprises presenting a flexible sentence structure in a user interface. The flexible sentence structure includes a plurality of parameters for defining an alert for a selected data cell. The parameters include an intersect name of the selected data cell, a threshold range type, and one or more alert threshold values. The method further comprises presenting an interactive graphical display in the user interface. The interactive graphical display includes a plurality of range bands and one or more threshold value indicators corresponding to the parameters of the flexible sentence structure. The method further comprises making changes to the flexible sentence structure and the interactive graphical display responsive to a user interaction to form a metrics threshold definition. The method further comprises generating code that creates alerts according to the metrics threshold definition.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 3A-3H show screens of display for a mechanism for defining metrics thresholds for ranges using a parameterized line of text synchronized with an interactive display in accordance with an illustrative embodiment;

FIG. 5 is a flowchart illustrating operation of an alert system for defining metrics thresholds for ranges using a parameterized line of text synchronized with an interactive user interface in accordance with an illustrative embodiment.

DETAILED DESCRIPTION

Figure 1:
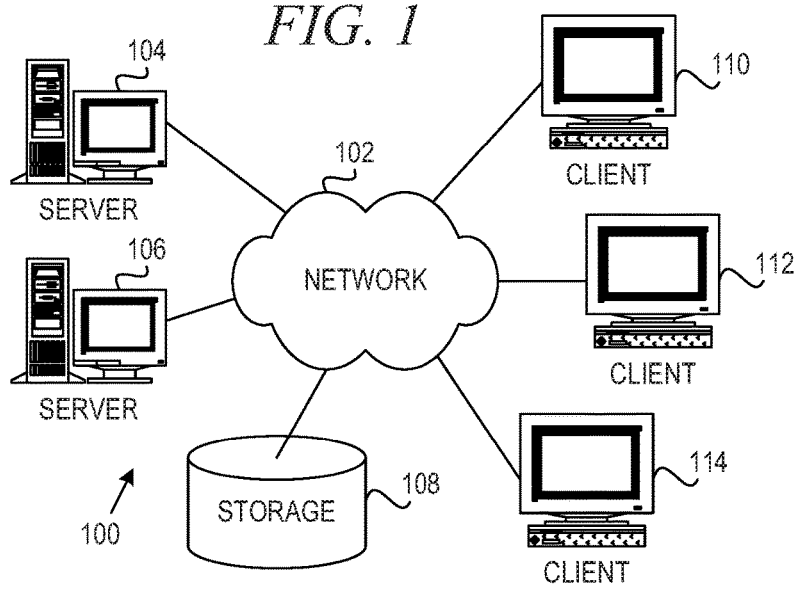
FIG. 1 is an example diagram of a distributed data processing system in which aspects of the illustrative embodiments may be implemented.

In Analytics systems, many users would like to monitor the status of key values in their businesses. This important information is captured in metrics, which are represented in many ways: notification messages or emails if a value threshold is reached, visualizations in a dashboard, trend and status indicators in charts and reports. For casual business users, it is not easy to define these metrics, because there are many variations of threshold ranges for which a user may wish to account. In most enterprise environments, it is the administrator who sets the metrics, often using software code, which provides the administrator a lot of flexibility. However, casual business users typically do not have the expertise to modify software code for defining complex metrics thresholds.

The illustrative embodiments provide an interactive user interface for defining metrics thresholds for ranges using a parameterized line of text. The illustrative embodiments use a flexible sentence structure to define thresholds for a metric and moments for alerts for a given data element combined with an interactive graphical visualization of the thresholds and the in-between data spaces. The flexible sentence structure changes as the user modifies parameters in either the sentence itself or in the interactive graphical visualization. The interactive graphical visualization can also change on changes in the flexible sentence.

In the illustrative embodiments, the threshold values may be based on data elements from the data set or specific values provided by the user. The user may use a time dimension in the data set to define the time-to-date definition for trends. The user may add or remove color bands that represent ranges from the interactive visualization, which impacts the flexible sentence. The illustrative embodiments allow a user to define metrics and thresholds in a visually interactive manner, while still allowing for permutations normally covered by coded systems.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
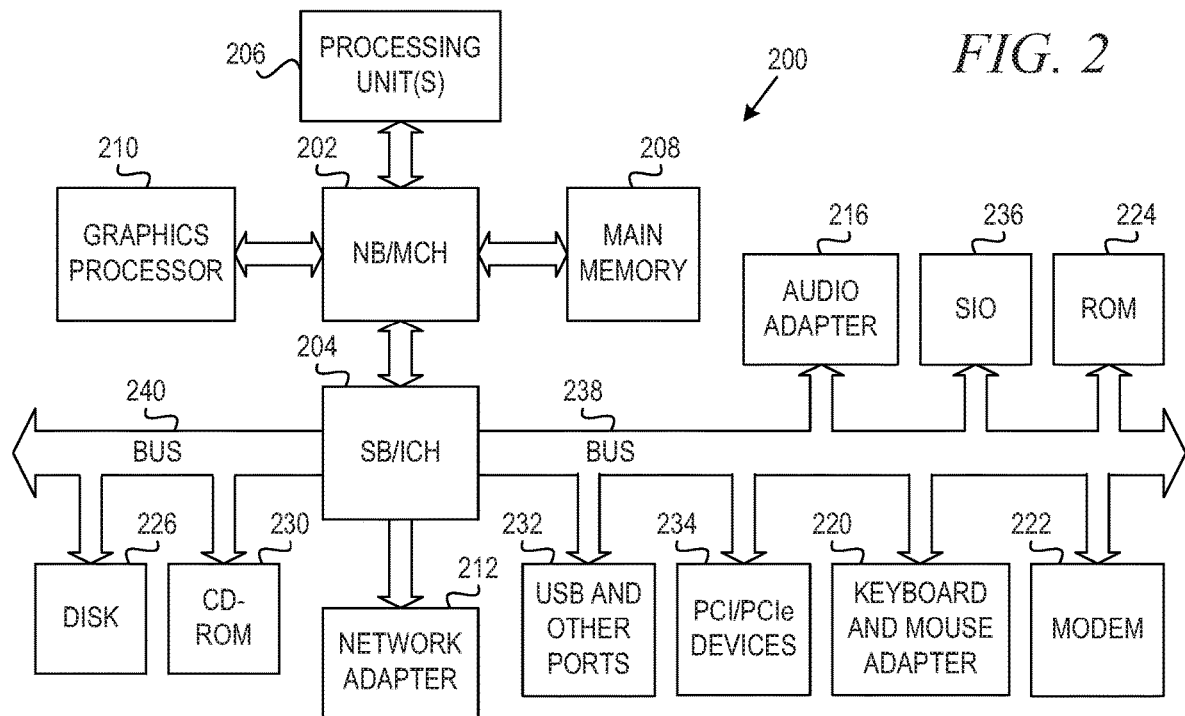
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for defining metrics thresholds for ranges using a parameterized single line of text synchronized with an interactive user interface. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates an analytics system with a mechanism for defining metrics thresholds for ranges using a parameterized line of text synchronized with an interactive user interface.

As noted above, the mechanisms of the illustrative embodiments utilize specifically configured computing devices, or data processing systems, to perform the operations for defining metrics thresholds for ranges using a parameterized line of text synchronized with an interactive user interface. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the mechanism for defining metrics thresholds for ranges using a parameterized line of text synchronized with an interactive user interface.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIGS. 3A-3H show screens of display for a mechanism for defining metrics thresholds for ranges using a parameterized line of text synchronized with an interactive display in accordance with an illustrative embodiment. The illustrative embodiments show possible interactions for defining metrics and thresholds for alerts. The user sees a visualization/report in which the user selects a value. In the report, the following data are available:
  a. Measures: Actual Cost, Production Target, Revenue
  b. Time: Year, Month, Day
  c. Other: Location, Products The user selects a data cell within the visualization/report and invokes a "set alert" option, for example. This information is taken as "context" for defining the metric (in the example of FIG. 3A, the specific location, the product and the measure).

With reference to FIG. 3A, display 310 presents a user interface for defining thresholds for an alert for a selected data cell in a set of data. Display 300 shows the following:
  a. The intersect name of the selected cell 312
  b. A sentence structure in which the user can change parameters for:
    i. threshold direction 313
    ii. a specific value or value based on other data items 314
    iii. a time data item 315 specification to determine the trend (if available)
    iv. the value when the user should be warned 316
  c. The current value from the selected data cell 320 and a preview of what the current status is based on the definition 321
  d. An interactive preview/visualization 317 in which the user can change the structure and values In the example shown in FIG. 3A, the data cell is for the value "actual cost" for furniture in North America. Display 310 presents a parameterized line of text 311, which presents a flexible sentence comprising a plurality of parameters 312-316. The intersect name 312 cannot be changed, because this is the initial measure from the selected cell. The user can change the other parameters 313-316 in the flexible sentence 311. FIG. 3B shows a menu for selecting a value for the threshold direction 313. For example, the user may mouse over, click, or right-click on threshold direction 313. Alternatively, the user may mouse over, click, or right-click on threshold direction indicator 319 in interactive visualization 317. Depending on the selection, the graphical preview 317 will change.

Interactive visualization 317 shows ranges of values for the selected data cell with respect to an alert target threshold 322 and a warning threshold 323. Control 318 allows the user to change the threshold direction 313 from above target to below target.

Figure 3D:
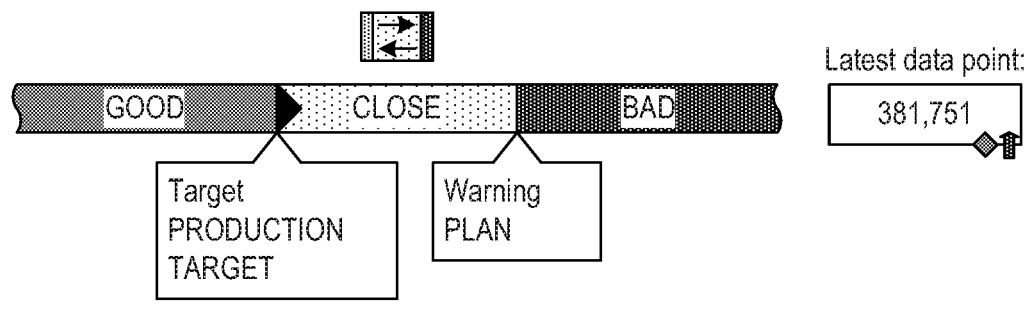
Figure 3E:
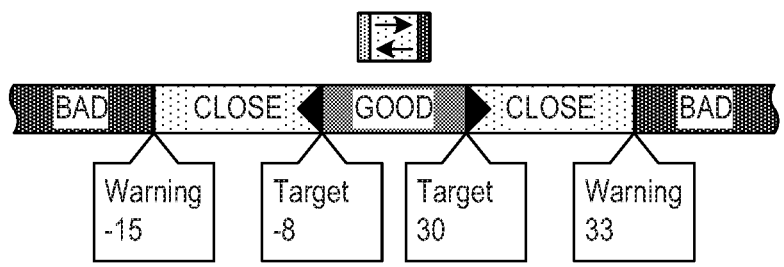
Figure 3F:
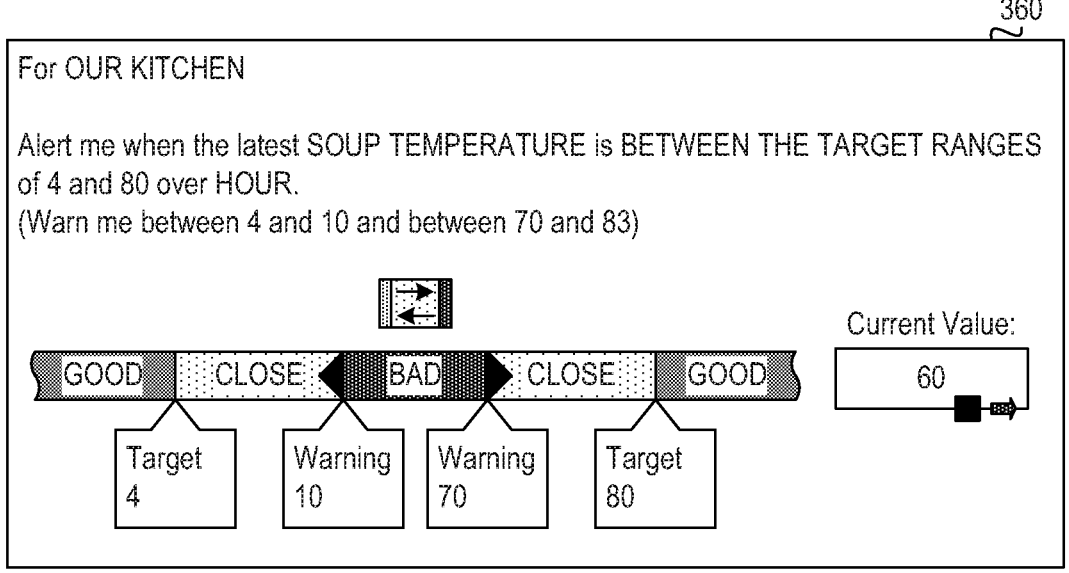

FIG. 3C shows a display 330 in which the user defines a threshold for an alert when the value for the data cell is below target with respect to a specified value. FIG. 3D shows a display 340 in which the user defines a threshold for an alarm when the value for the data cell is below target with respect to a specified value. FIG. 3E shows a display 350 in which the user defines a threshold for an alarm when the value for the data cell is outside a target range. FIG. 3F shows a display 360 in which the user defines a threshold for an alert when the value for the data cell is between target ranges.

As the user changes the threshold ranges type, the sentence adjusts itself to include the appropriate parameters. The parameters may include the following:
  a. Below or above: single value to compare against and a single moment to get warned. In the example shown in FIG. 3A, the value is "Production Target" and the moment to get warned is "Warn me at Plan."
  b. Outside the target range or between the target range: two values to compare against and two different moments to get warned. In the example shown in FIG. 3F, the two values to compare against are 4 and 80 and the two moments to get warned are between 4 and 10 and between 70 and 80.

Figure 3G:
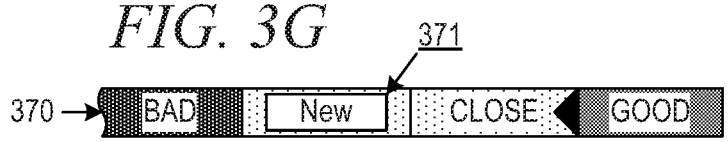

As shown in FIG. 3G, the user can change the color bands in the ranges. The user may interact with graphical preview 370 to add a new color range 371. In accordance with the illustrative embodiments, the user interface expands the flexible sentence such that the warning band is expanded. For example, the flexible sentence may add a new warning moment as follows: "Alter me when the latest ACTUAL COST is ABOVE TARGET of 3000 over Month. (Warn me at X and Y)."

Returning to FIG. 3A, switch control 318 is a shortcut to either switch the threshold range types between "above target" and "below target" or between "outside target range" and "between target ranges."

Figure 3H:
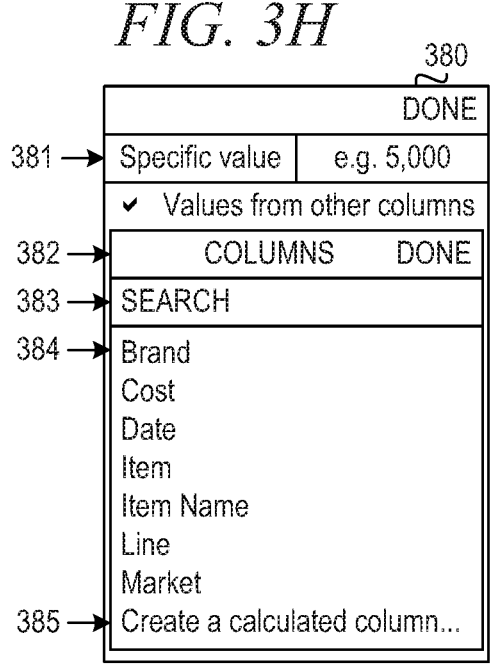

The user may also change the threshold values in the flexible sentence and within the interactive graphical preview itself. FIG. 3H shows an example drop-down menu 380 that may appear in response to the user interacting with the threshold value or warning moment, such as threshold value 314, warning moment 316, threshold target indicator 322, or warning moment indicator 323. Drop-down menu 380 includes a portion 381 to enter a specific value. Alternatively, drop-down menu 380 presents a menu 382 that allows the user to derive a threshold or warning value from other data items (columns). The menu 382 may include a search control 383, which allows the user to search for a particular data item if there are too many data items to list. Menu 382 may also include a list 384 of data items to be selected as the threshold or warning value. In one embodiment, the user may select an option 385 that allows the user to define a function of one or more data items as the threshold or warning value. For example, the function may be a percentage of a data item or a function of multiple data items, such as a sum of two data items.

Figure 4:
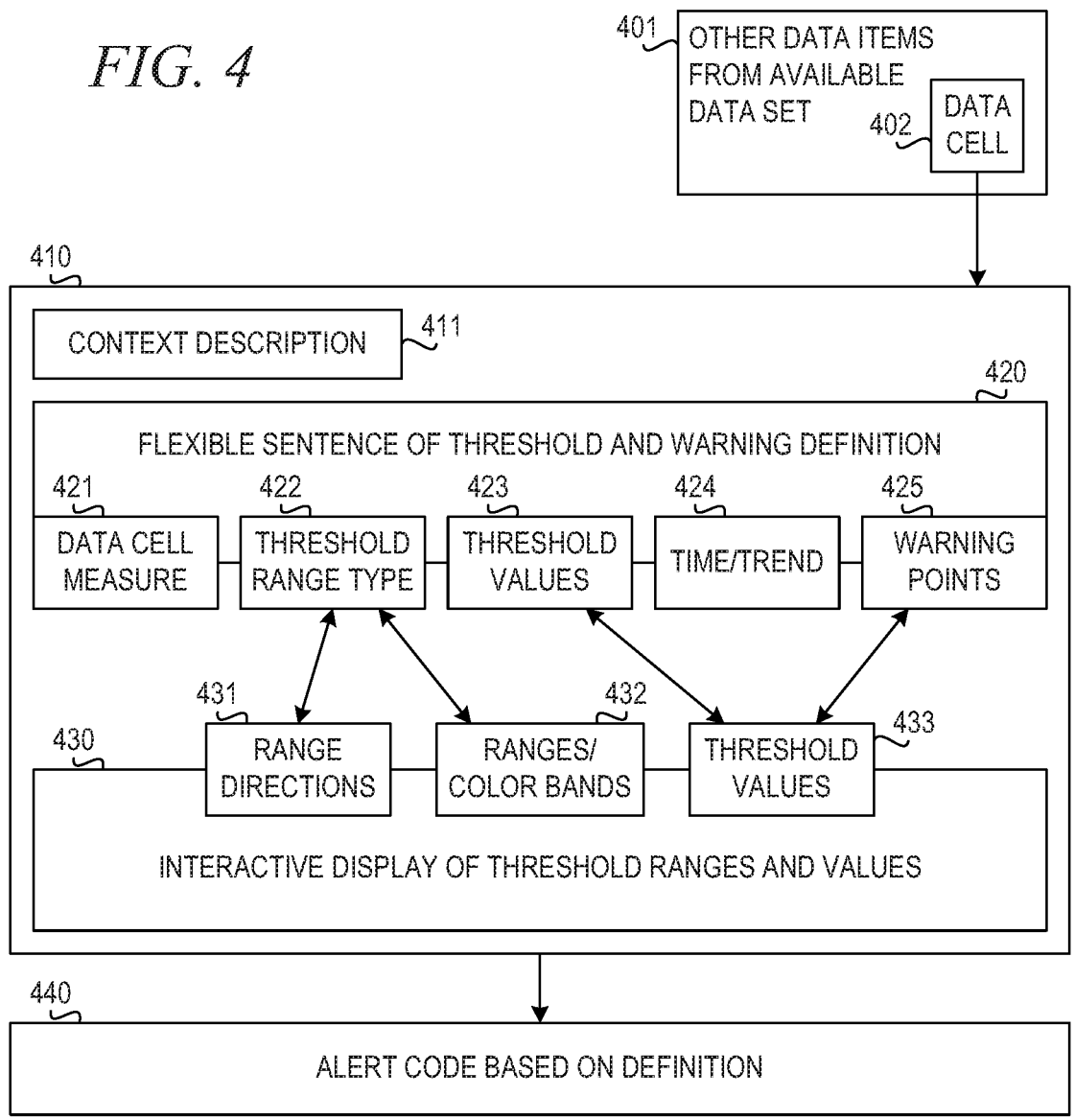
FIG. 4 is a block diagram of an alert system for defining metrics thresholds for ranges using a parameterized line of text synchronized with an interactive user interface in accordance with an illustrative embodiment.

FIG. 4 is a block diagram of an alert system for defining metrics thresholds for ranges using a parameterized line of text synchronized with an interactive user interface in accordance with an illustrative embodiment. A user selects data cell 402 from other data items from an available data set 401. Alert system 410 receives the selection of data cell 402 and generates context description 411 based on the selected data cell 402 and other data items from available data set 401.

Alert system 410 presents a user interface including flexible sentence of threshold and warning definition portion 420 and interactive display of threshold ranges and values portion 430. The flexible sentence portion 420 presents a plurality of parameters including data cell measure 421, threshold range type 422, alert threshold values 423, time/trend 424, and warning points 425. Interactive display of threshold ranges and values portion 430 presents an interactive graphical preview including range directions 431, ranges/color bands 432, and threshold values 433.

Changes made in flexible sentence of threshold and warning definition 420 affect the interactive graphical preview displayed by interactive display of threshold ranges and values portion 430. For example, a change to the threshold range type 422 affects range directions 431 and ranges/color bands 432. Changes made to the interactive graphical preview displayed by the interactive display of threshold ranges and values portion 430 affect the flexible sentence in flexible sentence of threshold and warning definition portion 420. For examples, a change to the threshold values 433 affects alert threshold values 423 and warning points 425.

Alert system 410 generates alert code 440 based on the definition. Alert code 440 generates a warning if the value of data cell 402 reaches one of warning points 425 and generates an alert if the value of data cell 402 reaches one of alert threshold values 423.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 5 is a flowchart illustrating operation of an alert system for defining metrics thresholds for ranges using a parameterized line of text synchronized with an interactive user interface in accordance with an illustrative embodiment. Operation begins (block 500), and the alert system presents a flexible sentence structure of an alert threshold and warning definition (block 501). The flexible sentence structure includes a plurality of parameters including the intersect name of the selected data cell, a threshold direction, a specified value or value based on other data items, a time data item specification to determine a trend, and a warning point value.

The alert system presents an interactive display of threshold ranges and values (block 502). The interactive display of threshold ranges and values includes a plurality of color bands, a range direction indicator, one or more alert threshold value indicators, and one or more warning point indicators.

The alert system receives a value from the selected data cell (block 503). The alert system presents the current value or latest data point for the selected data cell (block 504), determines a trend (block 505), and presents the trend in the interactive display (block 506).

The alert system determines whether the user changes a parameter in the flexible sentence structure or interactive display (block 507). If the user changes a parameter, the alert system makes the change to the flexible sentence structure and interactive display (block 508). Thereafter, or if the user does not change a parameter in block 507, the alert system determines whether the user is finished defining metrics thresholds (block 509). If the user is not finished, the operation returns to block 507 to determine whether the user changes a parameter.

If the user is finished defining metrics thresholds in block 509, then the alert system generates code that creates warnings and alerts according to the user's metrics threshold definitions (block 510). Thereafter, operation ends (block 511).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for defining metrics thresholds, the method comprising:
presenting a flexible sentence structure in a user interface, wherein the flexible sentence structure includes a plurality of parameters for defining an alert for a selected data cell, wherein the parameters include one or more alert threshold values;
presenting an interactive graphical display in the user interface, wherein the interactive graphical display includes one or more threshold value indicators corresponding to the parameters of the flexible sentence structure;
making changes to the flexible sentence structure and the interactive graphical display responsive to a user interaction to form a metrics threshold definition; and
generating code that creates alerts according to the metrics threshold definition.

2. The method of claim 1, wherein the parameters include a threshold range type, wherein the threshold range type comprises a below target range type or an above target range type, wherein the parameters include a single alert threshold value, and wherein the interactive graphical display includes a range direction indicator corresponding to the threshold range type.

3. The method of claim 2, wherein the parameters include a warning point value and wherein the interactive graphical display includes a warning point value indicator corresponding to the warning point value.

4. The method of claim 2, wherein the single alert threshold value is specified by the user or based on another data item.

5. The method of claim 2, Wherein the single alert threshold value is a function of at least one other data item.

6. The method of claim 2, further comprising:
presenting a switch control in the user interface; and
switching the threshold range type from below target range type to above target range type or from above target range type to below target range type responsive to the user interaction with the switch control.

7. The method of claim 1, wherein the parameters include a threshold range type, wherein the threshold range type comprises an outside target range type or a between target ranges type, wherein the parameters include a pair of alert threshold values defining a range, and wherein the interactive graphical display includes a range direction indicator for each of the pair of alert threshold values and corresponding to the threshold range type.

8. The method of claim 7, wherein the parameters include a pair of warning point value ranges and wherein the interactive graphical display includes a warning point value indicator corresponding each of the pair of warning point value ranges.

9. The method of claim 7, further comprising:
presenting a switch control in the user interface; and
switching the threshold range type from outside target range type to between target ranges type or from between target ranges type to outside target range type responsive to the user interaction with the switch control.

10. The method of claim 1, wherein the parameters include a time data item specification to determine a trend, the method further comprising:
receiving a value of the selected data cell;
determining the trend of the selected data cell over a time period specified by the time data item specification; and
presenting the value of the selected data cell and a trend indicator representing the trend of the selected data cell.

11. The method of claim 1, further comprising making changes to the flexible sentence structure responsive to the user making changes to the interactive graphical display.

12. The method of claim 1, further comprising making changes to the interactive graphical display responsive to the user making changes to the flexible sentence structure.

13. A computer program product comprising a non-transitory computer readable storage medium having a computer readable program stored therein, wherein the computer readable program, when executed on a computing device, causes the computing device to:
present a flexible sentence structure in a user interface, wherein the flexible sentence structure includes a plurality of parameters for defining an alert for a selected data cell, wherein the parameters include one or more alert threshold values;
present an interactive graphical display in the user interface, wherein the interactive graphical display includes one or more threshold value indicators corresponding to the parameters of the flexible sentence structure;
make changes to the flexible sentence structure and the interactive graphical display responsive to a user interaction to form a metrics threshold definition; and
generate code that creates alerts according to the metrics threshold definition.

14. The computer program product of claim 13, wherein the parameters include a threshold range type; wherein the threshold range type comprises a below target range type or an above target range type, wherein the parameters include a single alert threshold value, and wherein the interactive graphical display includes a range direction indicator corresponding to the threshold range type.

15. The computer program product of claim 14, wherein the parameters include a warning point value and wherein the interactive graphical display includes a warning point value indicator corresponding to the warning point value.

16. The computer program product of claim 14, wherein the computer readable program further causes the computing device to:
present a switch control in the user interface; and
switch the threshold range type from below target range type to above target range type or from above target range type to below target range type responsive to the user interaction with the switch control.

17. The computer program product of claim 13, wherein the parameters include a threshold range type, wherein the threshold range type comprises an outside target range type or a between target ranges type, wherein the parameters include a pair of alert threshold values defining a range, and wherein the interactive graphical display includes a range direction indicator for each of the pair of alert threshold values and corresponding to the threshold range type.

18. The computer program product of claim 17, wherein the parameters include a pair of warning point value ranges and wherein the interactive graphical display includes a warning point value indicator corresponding each of the pair of warning point value ranges.

19. The computer program product of claim 17, wherein the computer readable program further causes the computing device to:
present a switch control in the user interface; and
switch the threshold range type from outside target range type to between target ranges type or from between target ranges type to outside target range type responsive to the user interaction with the switch control.

20. An apparatus comprising:
a processor; and
a memory coupled to the processor, wherein the memory comprises instructions which, when executed by the processor, cause the processor to:
present a flexible sentence structure in a user interface, wherein the flexible sentence structure includes a plurality of parameters for defining an alert for a selected data cell, wherein the parameters include one or more alert threshold values;
present an interactive graphical display in the user interface, wherein the interactive graphical display includes one or more threshold value indicators corresponding to the parameters of the flexible sentence structure;
make changes to the flexible sentence structure and the interactive graphical display responsive to a user interaction to form a metrics threshold definition; and
generate code that creates alerts according to the metrics threshold definition.

* * * * *